(12) United States Patent
Fischer et al.

(10) Patent No.: US 7,722,827 B2
(45) Date of Patent: May 25, 2010

(54) CATALYTIC FLOW-THROUGH FAST LIGHT OFF CERAMIC SUBSTRATE AND METHOD OF MANUFACTURE

(75) Inventors: Michael Fischer, Corning, NY (US); Xiaodong Robert Fu, Painted Post, NY (US); Keith Leonard House, Corning, NY (US); Thomas Dale Ketcham, Big Flats, NY (US); David Ward Lambert, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1077 days.

(21) Appl. No.: 11/394,779

(22) Filed: Mar. 31, 2006

(65) Prior Publication Data

US 2007/0238256 A1 Oct. 11, 2007

(51) Int. Cl.
*B01D 50/00* (2006.01)
*B01D 53/34* (2006.01)
*F01N 3/00* (2006.01)

(52) U.S. Cl. .................. 422/168; 422/129; 422/211

(58) Field of Classification Search ............... 422/168, 422/129, 211; 438/303
See application file for complete search history.

(56) References Cited

U.S. PATENT DOCUMENTS

| | | | | |
|---|---|---|---|---|
| 4,199,477 A | * | 4/1980 | Hegedus | ............... 502/5 |
| 4,390,355 A | * | 6/1983 | Hammond et al. | ............ 55/523 |
| 4,857,089 A | * | 8/1989 | Kitagawa et al. | ............... 55/523 |
| 5,641,332 A | * | 6/1997 | Faber et al. | ................... 55/523 |
| 6,508,852 B1 | | 1/2003 | Hickman et al. | ............... 55/523 |
| 2005/0011186 A1 | | 1/2005 | Saito et al. | ..................... 60/297 |
| 2006/0006575 A1 | | 1/2006 | Dannoux et al. | ......... 264/171.1 |

FOREIGN PATENT DOCUMENTS

| | | |
|---|---|---|
| EP | 0 780 148 | 6/1997 |
| EP | 1 408 208 | 4/2004 |
| EP | 1 516 658 | 3/2005 |
| RU | 2011527 C1 * | 4/1994 |
| WO | 02/32545 | 4/2002 |
| WO | 2004/022481 | 3/2004 |
| WO | 2004/036003 | 4/2004 |

\* cited by examiner

*Primary Examiner*—Walter D Griffin
*Assistant Examiner*—Natasha Young
(74) *Attorney, Agent, or Firm*—Joseph M. Homa

(57) ABSTRACT

A fast light off flow-through ceramic substrate is provided that is particularly adapted for use as a catalytic converter. The substrate is formed from a body of ceramic material having axially opposing inlet and outlet ends for receiving and expelling the flow of automotive exhaust gas, respectively. The body contains a network of walls coated with a catalyst that define axially-oriented flow-through cell channels. The average thermal mass ($ATM_1$) of a first axial region of the walls adjacent to the inlet end is at least 20% less than the average thermal mass ($ATM_{TOT}$) of all of the walls. The lower average thermal mass of the walls in the first region advantageously shortens the light off time for the catalyst within the substrate to effectively neutralize automotive pollutants. The reduction of the average thermal mass in only the first axial region of the walls advantageously maintains the strength of the resulting body of ceramic material, and further increases the cool down time of the body.

20 Claims, 5 Drawing Sheets

Thinnest  Thicker  Thickest

CATALYTIC FLOW-THROUGH FAST LIGHT OFF CERAMIC SUBSTRATE AND METHOD OF MANUFACTURE

FIELD OF THE INVENTION

This invention generally relates to ceramic honeycomb structures of the type used in vehicular exhaust systems, and is specifically concerned with a catalytic flow-through ceramic substrate having fast light off characteristics.

BACKGROUND OF THE INVENTION

Ceramic honeycomb structures of the type used in vehicular exhaust systems are known in the prior art. Such structures generally comprise a network of interconnected walls (webs) that form a matrix of elongated, gas-conducting cells which are typically square or hexagonal in shape. The cell matrix is surrounded by a cylindrical outer skin to form a can-shaped structure having opposing inlet and outlet ends for receiving and expelling exhaust gases through the matrix of cells. Such ceramic honeycomb structures find particular application as catalyst-supporting substrates for automobile exhaust systems.

When such ceramic honeycomb structures are used as automotive catalytic converters, the cell walls are coated with a precious metal catalyst containing platinum, rhodium or palladium, for example. Such structures have a cell density of approximately 400 to 900 cells per square inch in order to maximize the area contact between the automotive exhaust gases which blow through the gas conducting cells, and the catalyst present on the walls. To reduce the pressure drop that the exhaust gases experience when flowing through the honeycomb structure, the walls are typically manufactured between 3.0 and 5.0 mils thick. The use of walls of such thickness also results in a reasonably short light off time of about 24 seconds (i.e., the time it takes before the webs reach the required 250° C. before the catalyst impregnated over the walls begins to oxidize CO to $CO_2$, and to effectively disassociate $NO_x$ into $N_2$ and $O_2$). A short light off time is important, as most of the automotive pollutants generated by an automobile with a catalytic converter are produced in the time between the automobile is first started until when the walls reach the required activation temperature of about 250° C.

In order to reduce the light off time even further, ceramic substrates having very thin walls, on the order of 2 mils or less, have been manufactured. However, the applicants have observed two major shortcomings associated with such thin-walled substrates. First, such substrates are structurally weaker than more conventional, thicker walled substrates. Hence, they are more prone to crack or to break during both the manufacturing process and the "canning" process when they are locked into a metal enclosure that forms part of the automotive exhaust system. Secondly, in operation, the thin walls may be prone to erosion along the face of the inlet end of the substrate due to the impingement of the particulate material entrained in the stream of exhaust gases. The resulting "sand blast" effect may weaken the already fragile structure, but may also render the inlet portion of the substrate ineffective in catalyzing pollutants by eroding away the catalytic coating on the cell walls, or even the walls themselves. In lieu of providing thinner walls to reduce the light off time of such ceramic substrates, substrates having the same thickness but a higher porosity have also been manufactured. However, the applicants have observed that these substrates suffer from the same deficiencies as thin-walled substrates do, i.e., insufficient mechanical strength, and excessive erosion near the inlet end.

Clearly, what is needed is an improved catalytic flow-through ceramic substrate having a shorter light off time without a significant reduction in the mechanical strength of the resulting substrate. Ideally, such a substrate would also have an erosion resistance at its inlet end that was at least comparable to the erosion-resistance of prior art ceramic substrates employing web walls between 3.0 and 5.0 mils thick. It would be desirable if such a fast light off substrate further had slower cool down properties to reduce the thermal gradient between the centroid and the outer skin of the substrate that can sometimes cause cracking due to differences in thermal expansion in these regions. Finally, it would be desirable if such a fast light off substrate were relatively easy and inexpensive to manufacture.

SUMMARY OF THE INVENTION

The invention is a fast light off catalytic flow-through ceramic substrate that avoids or at least ameliorates all of the aforementioned shortcomings associated with the prior art. To this end, the ceramic substrate of the invention comprises a body of ceramic material having axially opposing inlet and outlet ends for receiving and expelling of flow of automotive exhaust gas, respectively, and containing a network of walls that define axially-oriented flow-through cell channels, wherein the average thermal mass ($ATM_1$) of a first axial region of the walls adjacent to the inlet end is less than the average thermal mass ($ATM_{tot}$) of all of the walls. The body of ceramic material may include a second axial region of walls contiguous with the first region, and the average thermal mass of the walls in the first and second regions may be substantially uniform along the axis of the ceramic body. In such an embodiment, the walls in the first axial region may be thinner, more porous, or both than the walls in the second axial region, and the thickness, porosity, or both of the walls may abruptly change at the interface between the first and second wall regions. The first axial region may include the inlet end of the ceramic body. Alternatively, the first axial region may be slightly spaced apart from the inlet end of said ceramic body such that the average thermal mass of the walls forming the outlet end of the ceramic body is the same as the average thermal mass of the walls in the second axial region of the ceramic substrate. Preferably, the axial length of the first axial region is between about 10% and 45% of the axial length of the ceramic body, and the average thermal mass ($ATM_1$) of the first region is between about 20% and 50% of the average thermal mass ($ATM_2$) of the second region.

In still another embodiment, the thickness of the web walls may decrease at a substantially constant rate between the outlet and inlet ends. In such an embodiment, the first axial region of the web walls adjacent to the inlet end has an $ATM_1$, that is at least 20% less than the $ATM_2$ may be up to about 50% of the axial length of the body of ceramic material. Additionally, the web walls may be formed from a first, central or core layer of material whose thickness defines the minimum thickness of the web walls of the inlet end of the ceramic body, and a second ceramic material overlaying both sides of the first core layer in an ever-thickening layer between the inlet end and the outlet end of the ceramic body.

In either of the aforementioned embodiments of the invention, the thermal mass of the walls may also increase in a radial direction orthogonal to the axis of the ceramic body. Increasing the thermal mass (and hence either increasing the thickness or lowering the porosity) of the web walls in such a radial direction advantageously increases both the strength of the resulting ceramic body, as well as the time required for cool-down of the web walls, which in turn reduces the stresses caused by thermal gradients in the body that can sometimes lead to cracking.

In one method of the invention, the ceramic body is first formed with all of its walls having substantially the same thermal mass along the axis of the body. The average thermal mass of the walls adjacent to the inlet end of the body is reduced by either reducing the thickness of the walls, increasing their porosity, or both. This may be accomplished by chemically etching, for example, by immersing the first axial region of the ceramic body immersed in an acid, and secondly in an alkali solution in order to chemically etch away a portion of the walls. Alternatively, the first axial region may be exposed to a reactive fluid, such as an etchant gas, or to an abrasive suspended in a flow of fluid. Another method of the invention encompasses a co-extrusion technique for forming the embodiment of the invention having walls which vary in thickness along the axis of the ceramic body. This method of the invention comprises a co-extrusion technique wherein a first precursor ceramic material that forms the central portion of the walls is extruded at a constant rate, and a second precursor ceramic material which overlies the first material is extruded at a variable rate which decreases from the outlet to the inlet end of the ceramic body being formed.

All embodiments of the invention are advantageously capable of reducing the light off time of the resulting catalytic, flow-through ceramic substrate by 10-25% without significantly compromising the mechanical strength and durability of the resulting substrate.

DETAILED DESCRIPTION OF THE PREFERRED EMBODIMENTS

Figure 1A:
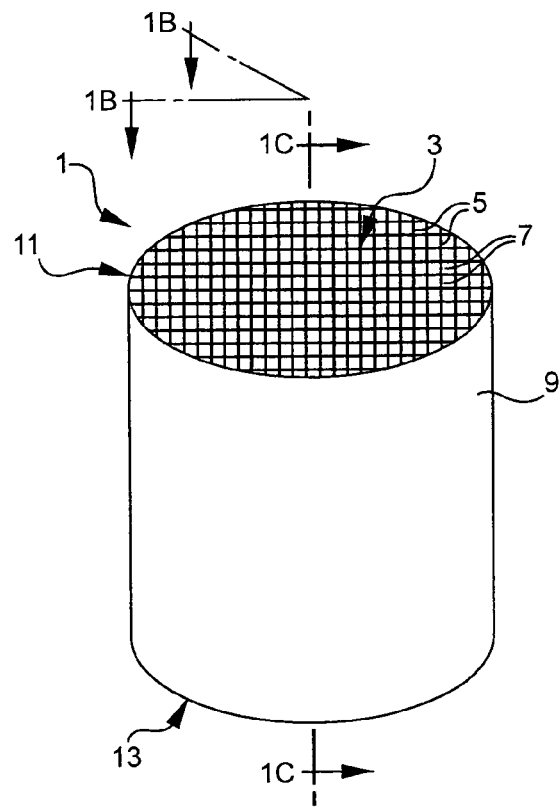
FIG. 1A is a perspective view of a prior art catalytic, flow-through ceramic substrate.
Figure 1B:
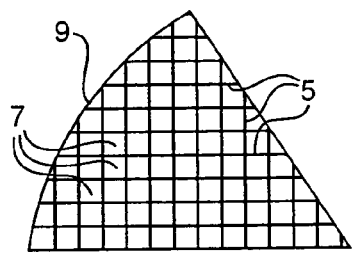
FIG. 1B is a plan view of an octant section along the angle 1B-1B of FIG. 1A, illustrating the network of web walls contained therein.
Figure 1C:
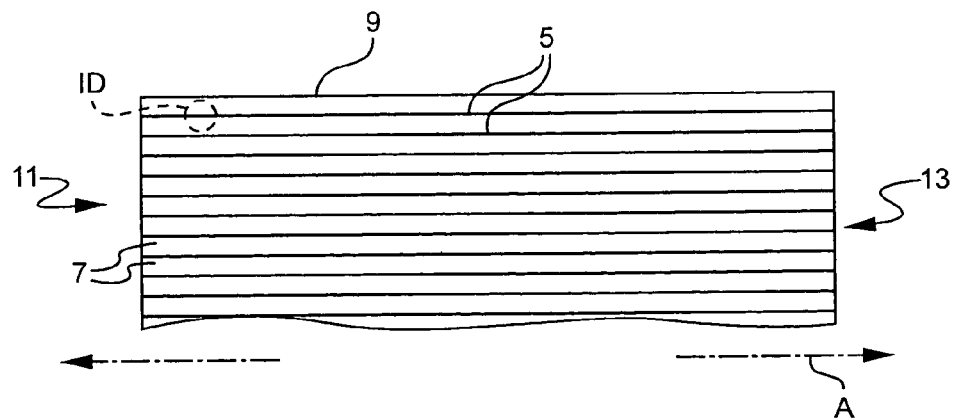
FIG. 1C is a partial side, cross-sectional view taken along the line 1C-1C of the substrate of FIG. 1A.

With reference now to FIGS. 1A through 1D, the invention is applicable to ceramic substrate 1 of the type used as automotive catalytic converters. Such substrates including network 3 of walls typically between about 2.0 and 6.0 mils thick which define a plurality of flow-through cell channels 7. While the cell channels 7 are illustrated as having a square cross-section in FIG. 1B, that may just as easily be octagonal, hexagonal or some other polygonal shape. The flow-through cell channels are typically between about 0.02 and 0.05 inches in width, and are arranged at a cell density of between about 300-900 cells per square inch. The substrate 1 further includes an extruded outer skin 9 which is typically cylindrical, and has a thickness of approximately three to four times that of the web walls 5. The resulting cylindrical structure of the substrate 1 has an inlet end 11, and an outlet end 13 which are opposed from one another along the axis A illustrated in FIG. 1C. In this application, the term "flow-through cells" encompasses cells designed to directly conduct a flow of exhaust gas or other fluid into the inlet end straight along the axis A illustrated in FIG. 1C and out through the outlet end, i.e., an unplugged structure.

Figure 1D:
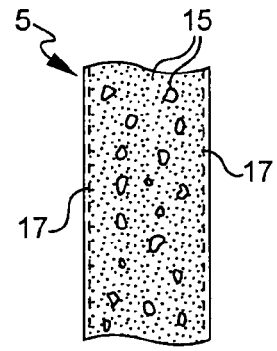
FIG. 1D is an enlarged, cross-sectional view of the web walls circled in phantom in FIG. 1C.

The walls 5 are formed from a porous ceramic material, such as cordierite, mullite, silicon carbide, or aluminum titanate. As is illustrated in FIG. 1D, the web walls 5 are porous, including a number of microscopic pores 15 which tend to reduce the density of the walls 5. Typically, the web walls 5 have a porosity of between 20%-40%. As is best seen with respect to FIG. 1D, the walls 5 are coated with a wash coat 17 which not only covers the outer surface of the walls 5, but penetrates the region adjacent to the outer surfaces (as is indicated in phantom). The wash coat 17 includes fine particles of a catalyst, which may include platinum, palladium or rhodium, or alloys thereof, which have been suspended in an alumina slurry. Such wash coats 17 are vacuum-deposited on the outer surfaces of the walls 5 to penetrate beyond the outer surfaces thereof, thereby increasing the surface area covered by the catalytic particles. Such vacuum-deposition of the wash coat 17, in combination with a high density of cell channels 7, maximizes area contact between automotive exhaust gases blowing straight through the cell channel 7 from the inlet to the outlet ends 13, and therefore maximizes the catalytic reaction of the wash coat in oxidizing carbon monoxide (CO) and in disassociating nitrous oxide ($NO_x$) into nitrogen and oxygen. However, before the wash coat 17 can become effective in promoting such pollutant-neutralizing reactions, it must first reach an activation temperature of approximately 250° C. The instant invention provides a ceramic substrate that attains the 250° C. "light off" temperature faster than the prior art substrate illustrated in FIGS. 1A-1D.

Figure 2A:
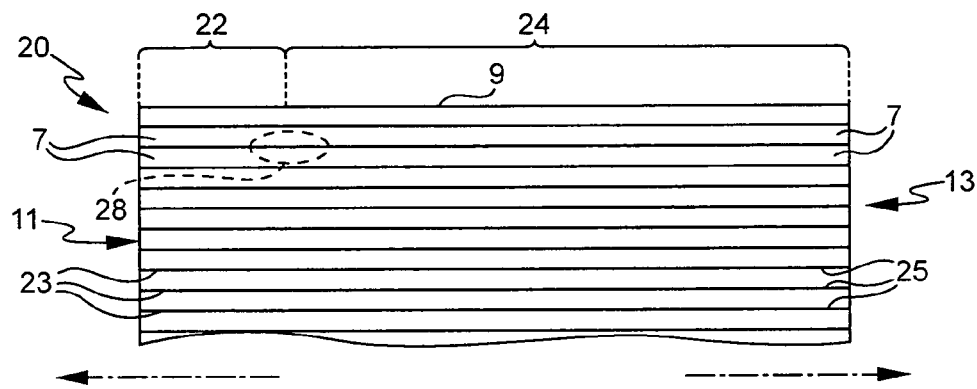
FIG. 2A is a cross-sectional side view of the fast light off, slow cool-down ceramic substrate of the invention, illustrating an axial region near the inlet end of the substrate having thinner web walls.
Figure 2B:
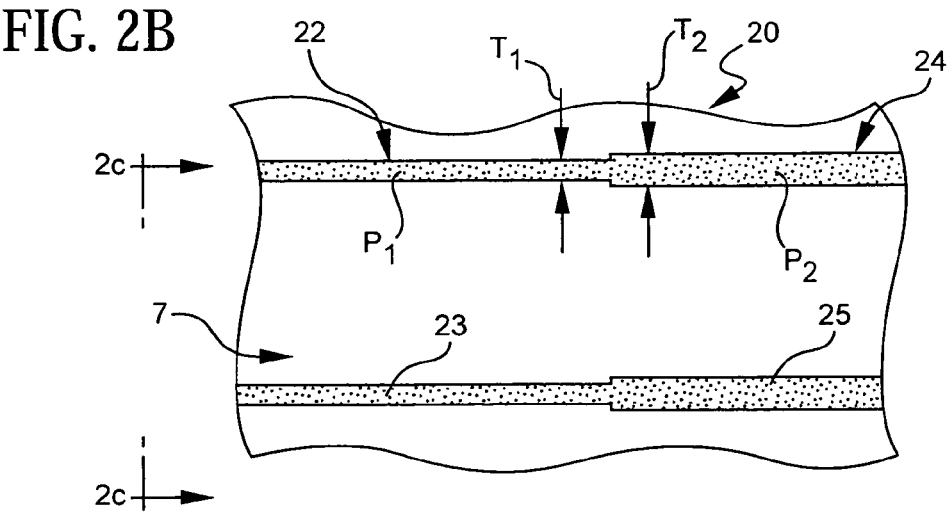
FIG. 2B is an enlargement of the area circled in phantom in FIG. 2A, illustrating the interface between the thinner walls in the axial region near the inlet end of the substrate, and the rest of the web walls of the substrate.
Figure 2C:
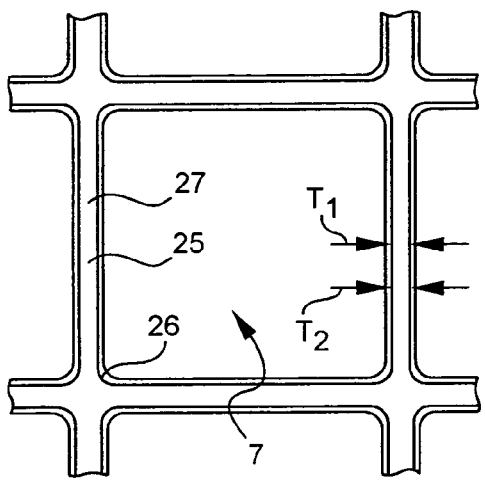
FIG. 2C is a view along the line 2C-2C of a cell formed by the web walls illustrated in FIG. 2B.

With reference now to FIGS. 2A through 2C, the fast light off, slow cool down ceramic substrate 20 of the invention includes a first axial region 22 having an average thermal mass ($ATM_1$) that is between 10%-35% less than the average thermal mass of all of the walls 5 ($ATM_{TOT}$), or even 10%-30% less than the $ATM_{TOT}$. To this end, the walls 23 within the first axial region 22 have between about 35-55% less thermal mass than the walls 25 located in a second axial region 24 axially contiguous with the first axial region 22. As is indicated in FIG. 2B, this difference in thermal mass is achieved not only by rendering the thickness $T_1$ of the walls 23 in region 22 less than the thickness $T_2$ of the walls 25 in the region 24, but further by increasing the porosity $P_1$ in the walls 23 relative to the porosity $P_2$ of the walls 25. However, it is equally within the scope of the invention that the reduction of the thermal mass within the first axial region 22 is accomplished solely by (1) reducing the thickness of the walls 23 relative to the thickness of the walls 25, or by keeping these thicknesses equal (i.e., $T_1=T_2$), but increasing the porosity $P_1$ of the walls 23 so that they are greater than the porosity $P_2$ of the walls 25; which may be approximately 35%-55% greater. Thus, the invention encompasses any ceramic substrate wherein a first axial region 22 of the web walls has less thermal mass than a second, contiguous axial region 24, whether such reduction in mass is accomplished by thinner walls, higher porosity, or any combination of both. When such reduction in thermal mass is achieved completely or substantially through the provision of thinner walls 23 in the first axial region, such walls 23 may be between about 1.5 mils and 2.5 mils. Ceramic substrates 20 having web walls less than 1.5 mils in thickness are not preferred due to the mechanical weakness of such walls, and the difficulty in their manufacture. In all cases, as best shown in FIG. 2C, reinforcing fillets 26 may be provided at the corners of the cell channel 7 to improve the strength characteristics of the resulting channel 7.

Figure 3:
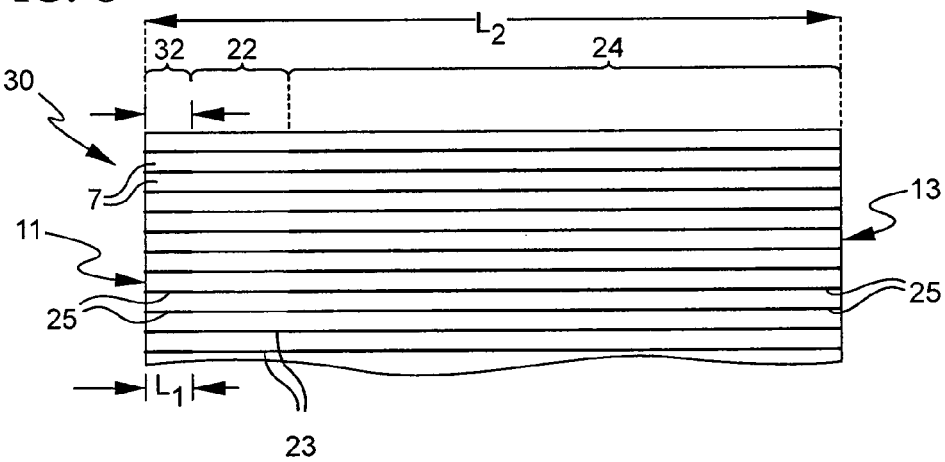
FIG. 3 is a side, cross-sectional view of a second embodiment of the substrate of the invention, illustrating how the axial region of thinner web walls is spaced apart from the inlet end of the substrate.

FIG. 3 illustrates a second embodiment 30 of the invention wherein the first axial region 22 does not include the inlet end 11 of the ceramic substrate. Instead, the first axial region 22 is spaced away from the inlet 11 by a relatively short inlet region 32 having a length $L_1$ which is between 5%-10% of the overall length $L_2$ of the ceramic body. The provision of such an inlet region 32 having web walls 25 that are just as thick as the web walls 25 of the second axial region 24, but of a relatively short length advantageously affords protection against erosion of the relatively thin walls 23 present in the first axial region 22 without significantly increasing the short light off time that these thin walls 23 provide when this embodiment 30 of the invention is in operation.

Figure 4:
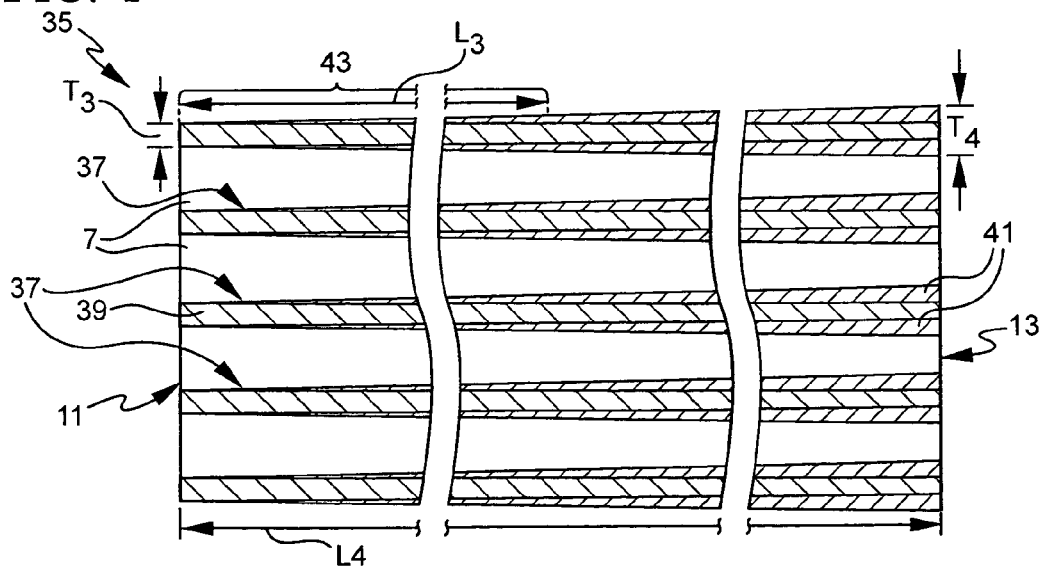
FIG. 4 is a partial side cross-sectional view of a third embodiment of the fast light off ceramic substrate of the invention, illustrating how the web walls may be tapered along the axis of the substrate such that they are thinner near the inlet end and thicker near the outlet end.

FIG. 4 illustrates a third embodiment 35 of the invention having walls 37 that are tapered along their longitudinal axis such that their thickness increases from the inlet end 11 to the outlet end 13. Each of the walls 37 includes a core portion 39 formed from a first ceramic material having a thickness $T_3$ which is preferably uniform among the longitudinal axis of the ceramic body, and tapered layers 41 of a second ceramic material overlying the core portion 39 as shown. The thickness of the tapered layers 41 linearly varies along the axis of the ceramic body at an angle such that the average thermal mass ($ATM_1$) of a first axial region 43 is at least 20% less than the average thermal mass ($ATM_{TOT}$) of all the walls 37. In this example of the third preferred embodiment 35, the thickness $T_3$ of the tapered walls 37 at the inlet end 11 is 2.0 mils, while the thickness $T_4$ of the tapered walls 37 at the outlet end 13 is approximately 4.5 mils. When the walls 37 are so dimensioned, the average thermal mass $ATM_{TOT}$ is 3.25. Hence, when the axial length of the first axial region 43 is approximately 50% the overall length of the ceramic substrate, the average thermal mass of the walls 37 is 2.625, which is approximately 80% of the $ATM_{TOT}$ of 3.25. Preferably, the slope of the tapered layers 41 is chosen such that the length $L_3$ of the first axial region 43 is 50% or less than the overall length $L_4$ of the ceramic substrate in order to ensure that the first axial region 43 will have a substantially shorter light off time than a substrate having walls of the same thermal mass, but of uniform thickness between the inlet and outlet ends 11, 13.

Figure 5:
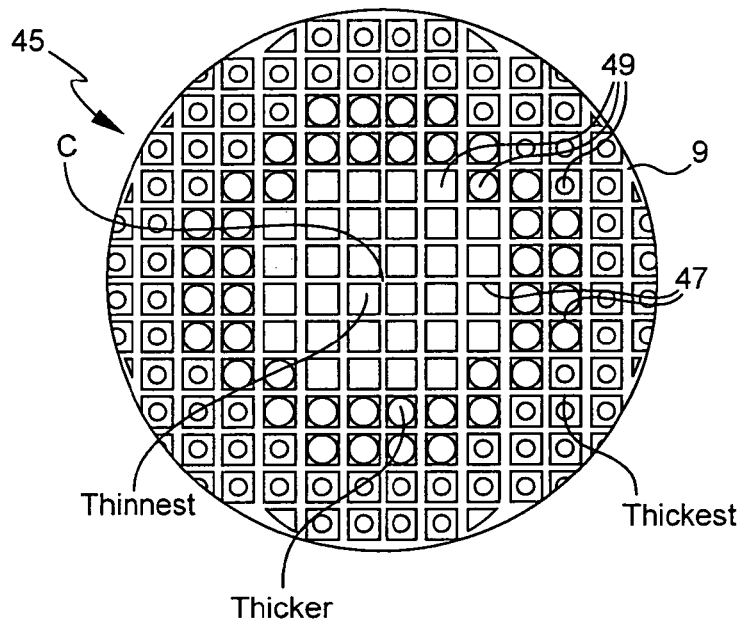
FIG. 5 illustrates how any of the three embodiments of the invention may also incorporate a radial thickening of the web walls between the centroid of the substrate, and its outer skin.

FIG. 5 illustrates a fourth embodiment 45 of the invention wherein the thermal mass of the walls 47 increases in a radial direction from a centroid C of the ceramic substrate. Such a thickening of the web walls 47 results in cell channels 49 having a smaller cross-sectional area toward the outermost region of the substrate, which in turn encourages the flow of the exhaust gases through the center-most region, where the walls 47 are the thinnest. Such a radially-oriented thickening of the walls is applicable to any one of the three previously discussed embodiments of the invention, and advantageously increases the mechanical strength of the substrate around its exterior regions with relatively little trade-off in the reduction of the light off time associated with walls 47 in the central region of the substrate. The rate of radial thickening of the walls 49 may be substantially linear along the radius, or non-linear, wherein most of the thickening occurs near the outer skin 9. Additionally, such radial thickening may occur in discrete steps along the radius, rather than increasing with each point along the radius. FIG. 5 illustrates the thinnest walls near the centroid, C, with thicker walls in an intermediate region, and the thickest walls adjacent the skin 9. In addition to increasing the mechanical strength of the outer portions of the substrate, such radial thickening also advantageously slows the cool-down associated with the substrate, thereby reducing thermal stresses when the flow of hot exhaust gases through the substrate is abruptly stopped.

Figure 6:
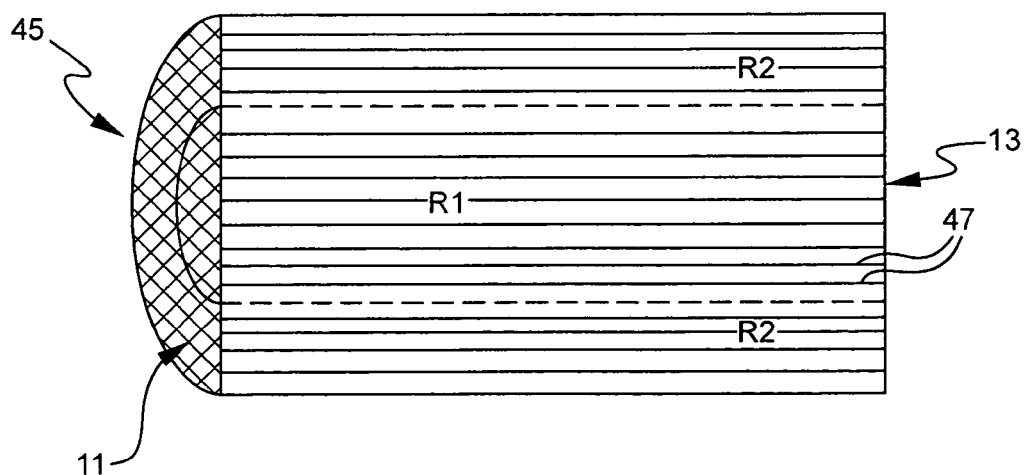
FIG. 6 is a schematized, cross-sectional view of an embodiment of the invention that incorporates the radial web thickening illustrated in FIG. 5.

FIG. 6 schematically illustrates an embodiment where the thickness of the web walls 47 would vary in the radial direction as illustrated in FIG. 5 combined with walls which tapered along the length as in embodiment of FIG. 4. In such an embodiment, the thinnest walls for any particular transverse cross section (parallel to the ends 11, 13), would be located in a region $R_1$. Conversely, the flow of exhaust gases would be progressively discouraged along the axis of the substrate 45 in the region $R_2$ complimentary to the region $R_1$ due to the greater pressure drop associated with the thicker walls provided in region $R_2$. Of course, optionally, there may be additional regions which allow for a more progressive change in the wall thickness in the radial direction. Each of the walls 47 would increase in the axial direction wherein they are thinnest at the inlet end 11 and thickest at the outlet end 13.

Figure 7A:
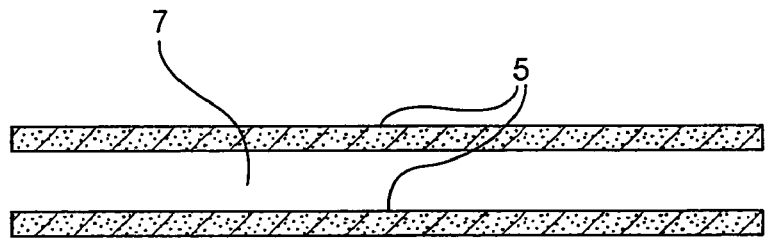
FIGS. 7A and 7B schematically illustrate how a tapered web wall embodiment of the invention such as that illustrated in FIG. 4 may be manufactured.
Figure 7B:
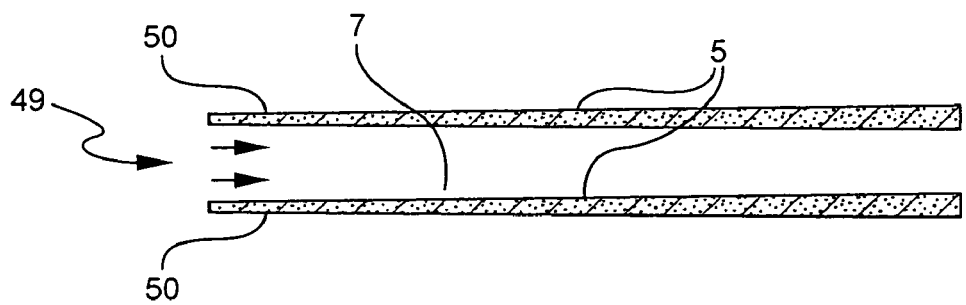

FIGS. 7A and 7B illustrate how a tapered wall embodiment similar to that illustrated in FIG. 4 might be manufactured. In this method of the invention, a substrate having web walls 5 of uniform thickness along the axis of the substrate is first fabricated. This substrate is then subjected to a gas flow 49 which may be formed from an etchant gas containing an acid, an alkali or both which creates tapered sections 50 in the web walls 5 via chemical dissolution. Alternatively, the gas flow 49 may include abrasive solid particles which create the tapered sections 50 via a "sand blasting" effect.

In an alternative method of the invention, a tapered wall embodiment such as that illustrated in FIG. 4 may be manufactured by way of the co-extrusion device disclosed in published Patent Application No. WO2006/002065 A2 entitled "Die Assembly and Method for Forming Honeycomb Filters" by Thomas Ketchum et al. and assigned to Corning, Incorporated, the entire specification of which is expressly incorporated herein by reference. The tapered wall embodiment of FIG. 4 could be manufactured by this device by providing a first precursor ceramic material to form the core 39 of the walls 37 at a uniform rate in the extrusion device, while simultaneously extruding a second precursor ceramic material to form the variable thickness layers 41 at a variable rate through such extrusion device. In such a method, the inlet end 11 would be extruded first with little or no co-extrusion of the second precursor ceramic material. However, as the extrusion was formed, an ever-increasing amount of second precursor ceramic material would be co-extruded over the core walls 39 as more and more of the ceramic substrate was formed, until a maximum amount of second precursor ceramic material was co-extruded as the outlet end 13 of the ceramic substrate was formed. To create the linearly-tapered walls illustrated in FIG. 4, the rate of co-extrusion of the second precursor ceramic material would increase substantially linearly over the axis of the substrate 35 during the extrusion formation. While it is possible that the core portions 39 and outer layers 41 may be formed from two different precursor ceramic materials having different ceramic compositions, it is preferable that the two different precursor materials be formed of the same ceramic compound (i.e., cordierite, mullite, silicon carbide, alumina titanate) but vary only in viscosity, with the ceramic precursor material forming the outer layers 41 having a lower viscosity than the material used to form the core portions 39 of the walls 37.

The method of the invention further includes methods for forming the first and second embodiments of the invention illustrated in FIGS. 2A through 2C and in FIG. 3. In such a method, after drying and cutting of the extruded "green body" having web walls 5 of uniform thickness throughout the axis A, but before the firing of the green body, the substrate is placed into contact with a reagent that chemical removes or dissolves a portion of the web walls such that the walls are thinned or increased in porosity, or both. Such contact may be implemented by dipping a portion of the substrate into a liquid solution, or may be done via a flow of reactive gas through the substrate, the difference from the first described method being that the walls 25 in the second axial portion 24 may be masked off with a coating to insulate them from contact with such a liquid or gaseous chemical reagent.

Alternatively, after drying and cutting of the "green body", but before the firing of the same, ozone gas may be conducted through the cell channels 7 in lieu of a liquid or gaseous chemical agent. Where the ozone contacts the green, unmasked substrate in the first axial region 22, it oxidizes and removes the binder that is within the precursor ceramic material. After a desired portion of the binder has been removed, the web walls are lightly abraded (by, for example, abrasive particles entrained in air, but needing much less contact than in the first-described method wherein "sand blasting" was exclusively relied upon) so as to remove the portion of the ceramic material from which the binder has been removed and thus make the web walls 23 thinner. Of course, any of the aforementioned methods may also be done after the firing of the green body if desired. One example of liquid chemical reagents that can be used to implement the aforementioned method are hydrochloric acid (HCl) and sodium hydroxide (NaOH). The first axial region 22 is first immersed or otherwise exposed to hydrochloric acid. When the green body is formed of cordierite, the hydrochloric acid removes mostly only MgO and $Al_2O_3$—very little of the silicon dioxide ($SiO_2$) is removed. To remove the silicon dioxide, the walls 23 of the first axial region 22 of ceramic substrate are next immersed in or exposed to a solution of sodium hydroxide (NaOH). When the length of the substrate 20 is four inches, the first one inch of the substrate is exposed to the aforementioned two-step leeching process. Such a method results in a 10% weight reduction, which corresponds to a 35% weight reduction in the one inch length in the first axial portion 22 relative to the balance of the web walls. Either of the embodiments of FIGS. 2 and 3 may optionally be formed by a co-extrusion in the similar manner as the FIG. 4 embodiment by alternative and intermittently starting and stopping the flow of the second precursor.

Figure 8:
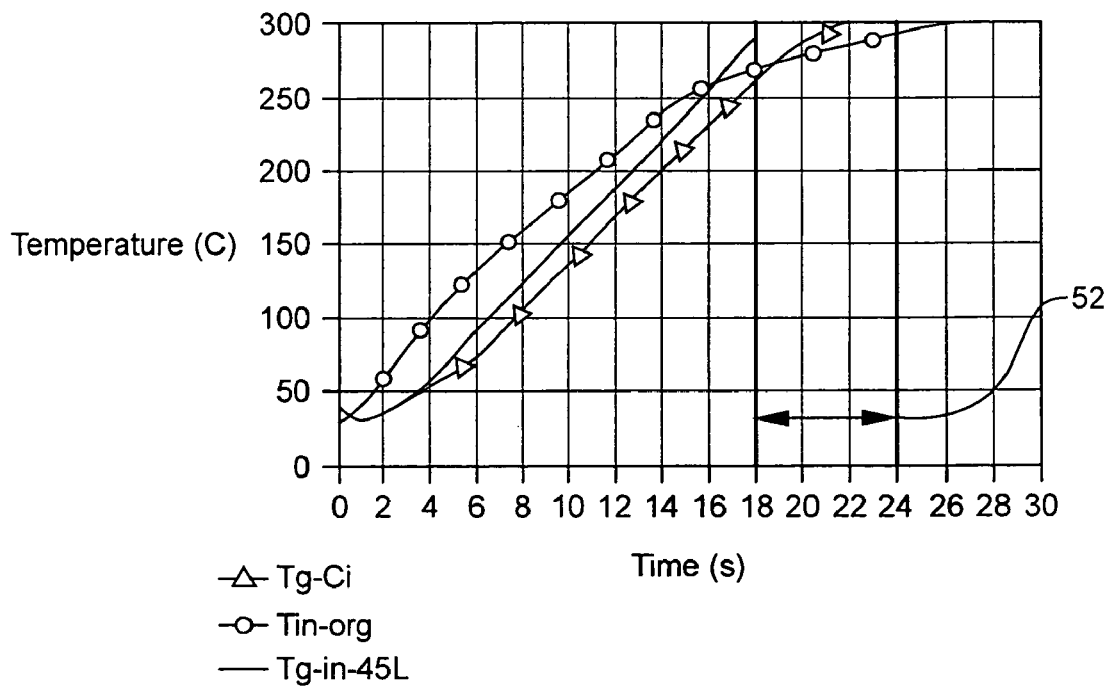
FIG. 8 is a graph illustrating how the substrate of the invention reduces the amount of time necessary for at least a portion of the substrate to arrive at the 250° C. necessary for effective catalyzing of automotive pollutants to occur.

FIG. 8 illustrates how the light off time of a thin-wall cordierite-containing flow through catalyzed substrate having 900 cells/inch and 2.5 mil wall thickness is substantially reduced when the average thermal mass $ATM_1$ of only the first one inch section of a four inch long ceramic honeycomb is reduced to a value that is substantially lower than the average thermal mass $ATM_{TOT}$ of all the web walls. In this particular example, the $ATM_1$ was 45% less than the $ATM_2$ of the balance of the web walls of the substrate. As can be seen from the graph, such a reduction in the average thermal mass in the one inch long first axial section 22 reduces the light off time by an amount 52 from about 24 seconds to about 18.5 seconds when measured at a length, x, where x=L/7, and L is the total length of the substrate. Thus, the light off time to 275 degrees C. is reduced by an amount of greater than 10%, or by even greater than 20% or more as compared to a like substrate without the reduced thermal mass. Since the great majority of automotive pollutants generated by an engine having a catalytic converter occurs during the light off time, the 20+% time reduction that the graph of FIG. 8 indicates approximately a 20+% reduction in pollutant emissions. Moreover, such a substantial reduction in pollutant emissions is accomplished by the invention with no substantial reduction in the mechanical strength of the resulting honeycomb.

While this invention has been described with respect to several preferred embodiments, various additions, modifications and variations of the invention will become evident to persons of ordinary skill in the art. All such variations and additions are encompassed within the scope of the invention, which is limited only by the claims appended hereto and equivalents thereof.

What is claimed is:

1. A flow-through ceramic substrate particularly adapted for use as a catalytic converter, comprising:
   a body of ceramic material having axially opposing inlet and outlet ends for receiving and expelling a flow of gas, respectively, and containing a network of walls that define axially-oriented cell channels extending unobstructed from the inlet end to the outlet end in a direction of an axis of the body, wherein a thickness of the network of walls increases in a radial direction from a centroid of the ceramic substrate and the axially oriented cell channels decrease in cross-sectional area in the radial direction from the centroid to encourage the flow of gas through the centroid,
   wherein the average thermal mass ($ATM_1$) of a first axial region of said walls adjacent to said inlet end is less than the average thermal mass ($ATM_{TOT}$) of all of said walls, and
   wherein a second axial region of said walls is axially contiguous with said first axial region, and the average thermal mass ($ATM_1$) of said walls in said first axial region is less than the average thermal mass ($ATM_2$) of said walls in said second axial region.

2. The ceramic substrate defined in claim 1, wherein the average thermal mass of said walls decreases from said outlet end toward said inlet end at substantially every point along said axis.

3. The ceramic substrate defined in claim 1, wherein an average thickness of the walls in said first axial region is less than an average thickness of all of said walls.

4. The ceramic substrate defined in claim 1, wherein an average porosity of the walls in said first axial region is greater than an average porosity of all of said walls.

5. The ceramic substrate defined in claim 4, wherein said average porosity in said first axial region is between about 25% and 60%.

6. The ceramic substrate defined in claim 1, wherein said first axial region is spaced apart from said inlet end.

7. The ceramic substrate defined in claim 1, wherein said axially-oriented cell channels exhibit a transverse cell density between about 300-900 cells per square inch.

8. The ceramic substrate defined in claim 1, wherein said walls are coated with a catalyst that promotes the oxidation of carbon monoxide and disassociation of nitrous oxide ($NO_x$).

9. The ceramic substrate defined in claim 1, wherein said walls are all less than 0.010 inch thick.

10. A method for fabricating a fast light off, slow cool down flow-through ceramic substrate comprising the steps of:
   forming a body of ceramic material having axially opposing inlet and outlet ends for receiving and expelling a flow of gas, respectively, and containing a network of walls that define axially-oriented cell channels extending unobstructed from the inlet end to the outlet end in a direction of an axis of the body, wherein a thickness of the network of walls increases in a radial direction from a centroid of the ceramic substrate and the axially oriented cell channels decrease in cross-sectional area in the radial direction from the centroid to encourage the flow of gas through the centroid, and
   varying the thermal mass of the walls along an axis of the body such that walls in a first axial region adjacent to said inlet end of said body have less average thermal mass than an average thermal mass ($ATM_{TOT}$) of all of said walls, and such that a second axial region of said walls is axially contiguous with said first axial region, and the average thermal mass ($ATM_1$) of said walls in said first axial region is less than the average thermal mass ($ATM_2$) of said walls in said second axial region.

11. The method defined in claim 10, wherein during the step of varying, said walls are formed with substantially the same thermal mass in the axial direction of the body, and further comprise a step of reducing an the average thermal mass of the walls in said first axial region.

12. The method defined in claim 11, wherein said step of reducing is implemented by chemically etching the walls in said first axial region to be thinner and to have a higher porosity than a balance of said walls.

13. The method defined in claim 11, wherein said step of reducing is implemented by exposing the walls in said first axial region to an abrasive suspended in a flow of fluid to cause exposed walls to be thinner than a balance of said walls.

14. The method defined in claim 11, wherein said step of reducing is implemented by exposing the walls to a flow of reactive fluid.

15. The method defined in claim 10, wherein said body is formed by extruding ceramic precursor material in an axial direction such that said outlet end of said body is formed first, and wherein said thermal mass of the walls is varied by extruding less ceramic precursor material in said first axial region of said body adjacent to said inlet end.

16. The method defined in claim 15, wherein said step of extruding said ceramic precursor material is implemented by co-extruding first and second materials which combine to form said walls, and wherein said thermal mass of the walls is varied by reducing the amount of said second material co-extruded with the first material along the axis of the body.

17. A flow-through ceramic substrate particularly adapted for use as a catalytic converter, comprising:
   a body of ceramic material having axially opposing inlet and outlet ends for receiving and expelling a flow of gas, respectively, and containing a network of walls that define axially-oriented cell channels extending unobstructed from the inlet end to the outlet end in a direction of an axis of the body, wherein a thickness of the network of walls increases in a radial direction from a centroid of the ceramic substrate and the axially oriented cell channels decrease in cross-sectional area in the radial direction from the centroid to encourage the flow of gas through the centroid,
   wherein the average thermal mass ($ATM_1$) of a first axial region of said walls adjacent to said inlet end is less than the average thermal mass ($ATM_{TOT}$) of all of said walls, and
   wherein a second axial region of said walls is axially contiguous with said first axial region, and the average thermal mass ($ATM_1$) of said walls in said first axial region is less than the average thermal mass ($ATM_2$) of said walls in said second axial region, and
   wherein an average porosity of the walls in said first axial region is greater than an average porosity of all of said walls.

18. A flow-through ceramic substrate particularly adapted for use as a catalytic converter, comprising:
   a body of ceramic material having axially opposing inlet and outlet ends for receiving and expelling a flow of gas, respectively, and containing a network of walls that define axially-oriented cell channels extending unobstructed from the inlet end to the outlet end in a direction of an axis of the body, wherein a thickness of the network of walls increases in a radial direction from a centroid of the ceramic substrate and the axially oriented cell channels decrease in cross-sectional area in the radial direction from the centroid to encourage the flow of gas through the centroid,
   wherein the average thermal mass ($ATM_1$) of a first axial region of said walls adjacent to said inlet end is less than the average thermal mass ($ATM_{TOT}$) of all of said walls, and
   wherein a second axial region of said walls is axially contiguous with said first axial region, and the average thermal mass ($ATM_1$) of said walls in said first axial region is less than the average thermal mass ($ATM_2$) of said walls in said second axial region, and wherein said first axial region is spaced apart from said inlet end.

19. The ceramic substrate defined in claim 1, wherein the average thermal mass of said walls in said first and second axial regions ($ATM_1$, $ATM_2$) is substantially uniform along said axis.

20. The ceramic substrate defined in claim 1, wherein the average thermal mass ($ATM_1$) of the first axial region is between about 30% and 40% less than the average thermal mass ($ATM_2$) of the second axial region.

* * * * *